United States Patent [19]

Landsrath et al.

[11] Patent Number: 4,933,918
[45] Date of Patent: Jun. 12, 1990

[54] APPARATUS FOR FRIGHTENING NOXIOUS ANIMALS BY MEANS OF ULTRASONIC SIGNALS

[76] Inventors: Walter J. Landsrath, Bornwiesenweg 77, 6000 Frankfurt/M.; Klaus Piper, Ohlauer Strasse 4, 1000 Berlin 36, both of Fed. Rep. of Germany

[21] Appl. No.: 257,162

[22] Filed: Oct. 12, 1988

Related U.S. Application Data

[63] Continuation of Ser. No. 155,064, Feb. 11, 1988, abandoned, which is a continuation of Ser. No. 54,103, May 20, 1987, abandoned.

[51] Int. Cl.$^5$ ............................................. H04B 1/02
[52] U.S. Cl. ..................................... 367/139; 43/124
[58] Field of Search .................... 367/139; 340/384 E; 43/124

[56] References Cited

U.S. PATENT DOCUMENTS

| | | | |
|---|---|---|---|
| 3,636,559 | 1/1972 | Del Grande et al. | 340/384 E |
| 3,872,472 | 3/1975 | Moschgat | 367/139 |
| 4,097,838 | 6/1978 | Fiala | 367/139 |
| 4,105,992 | 8/1978 | Luciano | 367/139 |
| 4,338,593 | 7/1982 | Mills | 367/139 X |
| 4,484,315 | 11/1984 | Hall | 367/139 |
| 4,566,085 | 1/1986 | Weinberg | 340/384 E X |

Primary Examiner—Thomas H. Tarcza
Assistant Examiner—Tod Swann
Attorney, Agent, or Firm—William A. Behare

[57] ABSTRACT

A device for frightening noxious animals by means of ultrasonic signals which includes an electro-acoustic transducer, having elements for electronic oscillation generation controlled by a freely programmable micro computer. The micro computer and the elements for the electronic oscillation generation are so designed that time-varying acoustic signals are randomly generated.

5 Claims, 2 Drawing Sheets

APPARATUS FOR FRIGHTENING NOXIOUS ANIMALS BY MEANS OF ULTRASONIC SIGNALS

This is a continuation of co-pending application Ser. No. 155,064 filed on Feb. 11, 1988, now abandoned, which is a continuation of Ser. No. 054,103 filed on May 20, 1987, now abandoned.

The invention relates to an apparatus for frightening noxious animals by means of ultrasonic signals.

Attempts have already been made to use ultrasonic devices for driving noxious animals away from a certain area (U.S. Pat. Specification No. 4,105,992, column 1, line 39 and following). Such devices have proved however ineffective, at least if used over a longer period of time because animals driven away in the beginning returned after a certain time. The reason may be, as is the case with other acoustic deterrents, such as rattles, gun shots and the like that instead of the desired frightening effect, the animals get accustomed to it, which in case of more intelligent animals may even lead to them becoming curious. In the long run, therefore, the prior art sound frightening devices including the devices for ultrasonic radiation exhibit a limited effect only.

It was not possible to reliably eliminate this deficiency by combining devices for attracting noxious animals by means of ultrasound with mechanical devices such as traps permanently neutralizing the animals so caught (U.S. Pat. Specification No. 4,105,992). In this connection, the principle reservation has to be made that by exterminating individual noxious animals, their environmental space is not impaired, it is rather improved so that birth control mechanism will provide for a balance of the animals killed. More intelligent animal species showing a distinct social and communication behaviour are so able to learn that the prior art mechanical devices become more and more ineffective in the long run.

In detail, in such a prior art device for attracting noxious animals by ultrasonic signals, data for the generation of ultrasonic signals having predetermined frequencies, time durations and repetition rates are stored in an electronic storage. To this effect, recordings of the instinctual vocalization generated by the babies of the noxious animals are used which are digitized and stored in a memory unit. The stored recording is non-destructively read out of the memory and converted back to an analogue signal which substantially corresponds to the sound wave form generated by the young noxious animal. This signal is amplified and guided to the electro-acoustic transducer by which the female animals are attracted to a pre-determined trap. One embodiment of such a device attracting by means of ultrasonic signals includes a ROM storage as well as an address counter both being controlled by a clock pulse control. In this way, the digital wave shapes stored in the ROM storage and corresponding to the acoustic signals generated by the young animals are sequentially read out in accordance with the address. These digital wave shapes are on one hand guided via a first digital to analogue converter, a frequency-variable oscillator controlled thereby and an amplifier, to the transducer. An additional portion of the ROM storage, on the other hand, controls a second digital to analogue converter, which determines the the amplitude of the ultrasonic signals, or interval between these ultrasonic signals, respectively. To this end, the second digital to analogue converter controls the amplifier mentioned. The apparatus described attracting by means of ultrasound displays, as do similar devices attracting by ultrasonic signals, the disadvantage that the effect of the ultrasonic signals is restricted to particular animals only. The ultimate aim is to reduce the reproduction of the noxious animals in the vicinity of the device, which however constitutes a long process which with a view to the effect of becoming accustomed as mentioned will probably never occur. The devices attracting by ultrasonic signals have moreover to be combined with either mechanical or chemical means for the extermination of the animals which may become dangerous for animals as well not to be driven away.

It is therefore the aim of the present invention to provide improved devices for frightening noxious animals by means of ultrasonic signals, which operate reliably over a longer period of time and so control particular species of noxious animals that even in the long run no accustomization effect is experienced. This frightening and scaring away should be selective for particular noxious animals and is to be effective also in case of such species which because of their distinctive communication and social behaviour and their relatively high intelligence are otherwise hard to be combatted. Noxious effects on other animal species, objects such as food and human beings should reliably be avoided.

This problem is solved by the invention revealed.

In accordance with the invention, a small and light-weight micro computer is used to determine adjustable variable frequencies and sound sequence intervals which are tuned to the particular species, or plurality of such species, to be driven away so that in connection with an electro-acoustic transducer a constantly varying acoustic molestation of these species is generated which will cause their retreat. For programming such frequencies and sound sequence intervals as well as volume differences, if necessary, generally-obtained knowledge on perception and generation of pitch tones in the case of small mammals may be used as well (Prof. N. C. Juhr, Ultraschall-Laute von Ratten—Indices fü reine Verhaltensbeurteilung (Ultrasonic sounds by rats—Indices for the assessment of the behaviour), Tierlaboratorium 4, 1977, p. 240, edited by Fachrichtung für Versuchstierkunde und Versuchstierkrankheiten der F. U. Berlin; S. Gruner, Vergleichende Geräuschpegelmessung und Frequenzalyse im Tierlaboratorium (Comparative sound level measurement and frequency analysis in the veterinary laboratory), Doctoral dissertation, Berlin, 1982). The use of the micro computer or equivalent micro controller for the pre-determination of the frequencies, sound sequence intervals and volumes offers the particular advantages that by means of small, inexpensive and robust devices, a great variation width of frequencies, sound sequence intervals and volumes is made available from which the most suited parameters for scaring away particular species may be selected, time-variable and at random, and hence may continuously within a wide range be variable.

The random variation of the acoustic signals which counteracts the effects of becoming accustomed in noxious animals becomes particularly reliable in that the micro computer includes a random number generator not repeatingly varying the parameters, pitch, volume and intervals of the sound sequence.

The micro computer and the electronic elements belonging to it and/or connected thereto are preferably designed in accordance with CMOS technology in order to promote the energy-saving use of these devices.

The devices are thus easily transportable and may flexibly be employed. The operating reliability may be enhanced by providing an emergency battery if the device is fed from the normal power supply.

The micro computer and further means for electronic oscillation generation connected therewith, if any, are preferably so designed that acoustic signals from the electro-acoustic transducer are almost completely emitted in the ultrasonic frequency range. In this way, molestations particularly of human beings are avoided. In order to render control of the operation of the device possible, the micro computer may advantageously so be switched over that the sound frequencies in the ultrasonic range normally not audible may be converted into the sound range audible by the human ear.

By means of the additional reset and pause logic according to claim 6, operational reliability is to be warranted even in cases of non interruption free connection of the power supply source, by the operator, that is if by connecting the power supply source for instance to a car battery or an electric supply line, disturbing pulses might be generated because of unreliable contacts. By providing the additional reset and pause logic safeguarding that reset pulses are emitted substantially longer than the reset pulses normally generated in a micro computer, the registers of the micro computer, particularly the program counter, are notwithstanding the disturbing pulses set into a defined starting condition (Program counter to value 0). The program for the generation of time-variable sound signals as in accordance with a program stored in a user program memory of the micro computer may therefore start in the way envisaged. The micro processor unit of the micro computer executes the first instruction which corresponds to the value 0 of the program counter; subsequently the micro computer executes the stored user program in the correct sequence.

It has been found that an extension of the duration of the reset pulse up to 30 seconds for the connection of the device, optimizes the subsequent orderly operation because on one hand no further disturbing pulses need by expected after this period and, on the other, the interval up to the start of the operation of the device is not too long.

According to claim 8, a system comprising the devices is suitably so designed that the devices radiate their specific sound sequences completely independently from each other. By the lacking co-ordination of these individual sound sequences the effect of accustomization is counteracted in a very inexpensive way. Because each individual device is relatively simple, it is particularly suited for building up a system of individual parts independently from a central electronic portion. At the same time, flexibility and mobility of the system are enhanced.

It has shown to be particularly advantageous to employ devices according to the invention in the engine spaces of vehicles in order to avoid the destruction of the cables by rodents. By eating the cables, considerable damage was done on parked cars particularly in rural areas. The described devices for frightening noxious animals by means of ultrasonic signals are particularly suited with a view to their improved effectivity, their reliability in operation and the compact build-up, for the use in the engine spaces of vehicles where they may for instance be secured by a particularly suitable magnet adhesion device and connected to the car battery. Adverse effects on domestic animals can be avoided because of the stored variable specific ultrasonic signal sequences.

One embodiment of the invention will in the following be described in more detail based on a drawing including two figures.

Figure 1:
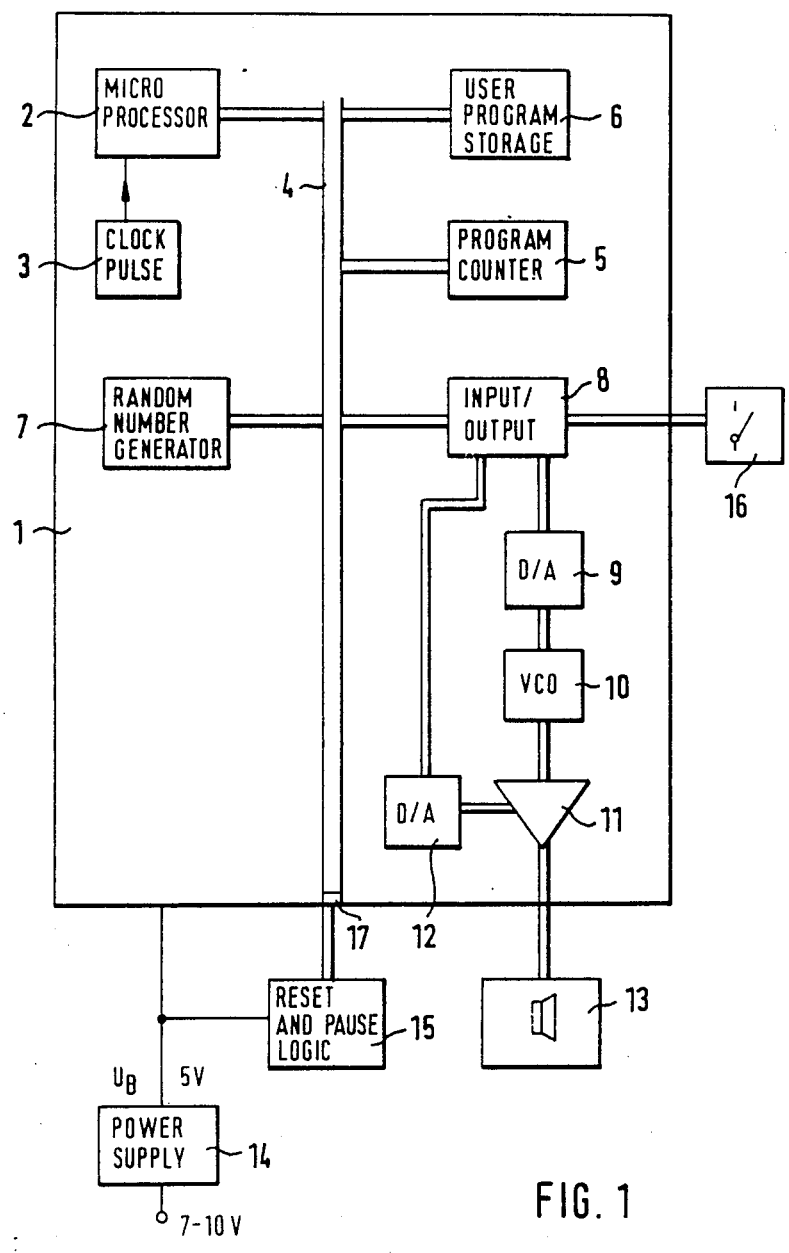
FIG. 1 is a simplified block diagram of the apparatus.

In FIG. 1, a micro computer designated by 1 is preferably provided in accordance with CMOS technology. The micro computer comprises a micro processor 2 driven by a timing generator 3 and connected to a bus 4. A program counter 5 made up by a register, a user program memory 6, a random number generator 7 as well as an input and output element 8 may be connected to bus 4 as well.

An additional electronic portion in the micro computer includes a first digital to analogue transducer 9, a variable frequency oscillator 10 controlled by it, a controlled amplifier 11 after it, feeding an externally-connected piezoelectric converter 13. The controlled amplifier 11 is additionally controlled by the second digital to analogue transducer which receives its input signals from bus 4 (via element 8).

User program 6 includes a program for the parameters which determine the pitch, sound pressure and intervals between the sound sequences of the ultrasonic signals finally radiated by piezoelectric converter 13.

The program is run by the pulsed micro processor 2. This process is controlled by program counter 5. The processing of the program is moreover randomly influenced by random number generator 7 so that one or a plurality of the parameters mentioned are non-repeatingly varied so that kind of specific frightening of the noxious animals is obtained by the ultrasonic signals radiated by the piezoelectric converter on one hand, the effect of accustomization of these animals however is effectively counteracted, on the other.

The analogue signals feeding the piezoelectric converter 13 the shape of the characteristic of which corresponds to the course of the sound pressure, are generated as follows: Via input/output element 8 which receives binary data determining the parameters of the ultrasonic pulses from bus 4, the digital to analogue transducer 9 for the ultrasonic frequency is fed. The digital to analogue transducer feeds an analogue voltage to the variable frequency oscillator 10, which corresponds to the sound level to be radiated by the converter 13. The amplitude of the sound signals and the intervals between them, respectively, are determined by the second digital to analogue transducer 13 correspondingly engaging in amplifier 11 for the control of the amplification factor.

By means of a switch 16 for the sound level, the frequency of the radiated acoustic signals may, via input/output element 8, so be decreased that it is in the audible range.

The micro computer is fed by a power source supply 14 having a stabilized operation voltage of for instance 5 volts. To this end, the power supply source of the present exemplified embodiment is connected to a car battery delivering a voltage in the range of about 12 volts.

In order to be able to start the micro computer for the orderly operation of the program, in spite of perhaps incorrect connection of the power supply source 14 to the car battery (or in other applications to other energy sources), the micro computer receives, at its reset input 17, such a long reset pulse that after the expiration of the reset pulse no disturbing pulses have to be expected from the power supply source. To this end, all the registers of the micro computer, particularly the program counter 5 is set, by the preferred reset pulse, to 0, or the starting state, respectively. The reset pulse of the preferred duration of 30 seconds is generated in the reset and pause logic 15. The emission of the reset pulse is initiated by the first pulse of the operation voltage, is not however influenced by the subsequent disturbing signals.

Figure 2A:
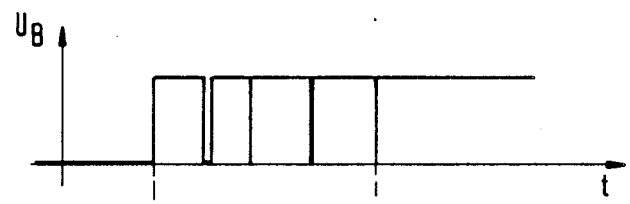
FIG. 2a is a typical course of the operation voltage after the connection to the power supply and FIG. 2b is the corresponding reset pulse.
Figure 2B:
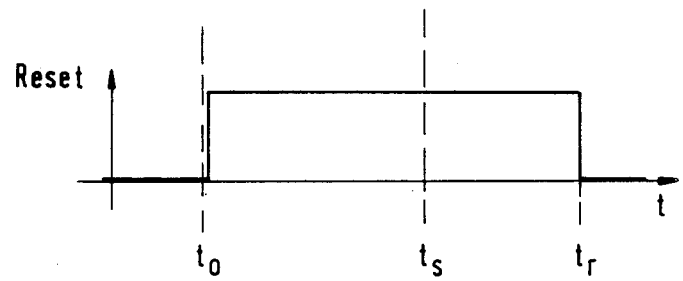

This process is shown in FIGS. 2a and 2b. The operation voltage in FIG. 2a shows a series of disturbing pulses. The reset pulse starts with the first increase of the operation voltage at the moment t0 and continues to $t_r$. After the occurrence of the last disturbing pulse of the operation voltage at the moment $t_s$, a sufficiently long minimum reset time passes in order to set the micro computer into the desired state.

In other application cases, when it is sure that the operation voltage remains stable during the switch-on moment, the period of time to the end of the reset pulse (reset release) may be kept short as normal.

During the course of the reset time period, the current consumption of the micro computer is decreased.

The micro computer having the described properties for ultrasonic signal generation as in accordance with the invention may be obtained by other more or less preferred structures as well.

We claim:

1. Apparatus for frightening noxious animals by means of ultrasonic signals which includes a piezoelectric ultrasonic transducer comprising:
    a freely programmable micro computer including elements for electronic oscillation generation connected to the transducer for the production of acoustic signals which are of randomly varying frequencies and repetition rates;
    said micro computer and elements for electronic oscillation generation connected thereto are tuned to the generation of signals completely in the ultrasonic frequency range and that said micro computer is randomly reversible into an operational state in which the sound sequences are transposed into a sound range audible for the human ear.

2. Apparatus for frightening noxious animals comprising:
    freely programmable micro computer means;
    electronic oscillation generation means connected to and controlled by said micro computer for the production of ultrasonic signals which are of randomly varying frequencies and repetition rates;
    random number generator means connected to said micro computer means to limit repetition of constantly changing parameters of pitch, acoustic pressure and intervals between said ultrasonic signals; and
    at least one micro-computer to control the parameters of the ultrasonic signals and for the generation of the corresponding sounds, wherein said microcomputer and said elements are of CMOS technology;
    wherein a power source of said micro computer is a car battery which is coupled to a reset input of said micro computer, with said reset and pause logic emitting a reset pulse of at least several seconds to said reset input after connection to a power source.

3. Apparatus according to claim 2 wherein:
    the duration of said reset pulse is approximately 30 seconds.

4. A system comprising a plurality of apparatusses according to claim 3, wherein
    the apparatusses for radiating specific sound sequences are not functionally connected with one another.

5. The use of apparatusses according to claim 4, wherein
    said apparatusses are mounted in the engine space of motor vehicles.

* * * * *

UNITED STATES PATENT AND TRADEMARK OFFICE
CERTIFICATE OF CORRECTION

PATENT NO. : 4,933,918

DATED : June 12, 1990

INVENTOR(S) : Walter J. Landsrath et al

It is certified that error appears in the above-identified patent and that said Letters Patent is hereby corrected as shown below:

In Claim 2, column 6, line 23, after "said", delete "elements" and insert --electronic oscillation generator--.

Signed and Sealed this

Twenty-eighth Day of January, 1992

*Attest:*

HARRY F. MANBECK, JR.

*Attesting Officer*      *Commissioner of Patents and Trademarks*